UNITED STATES PATENT OFFICE.

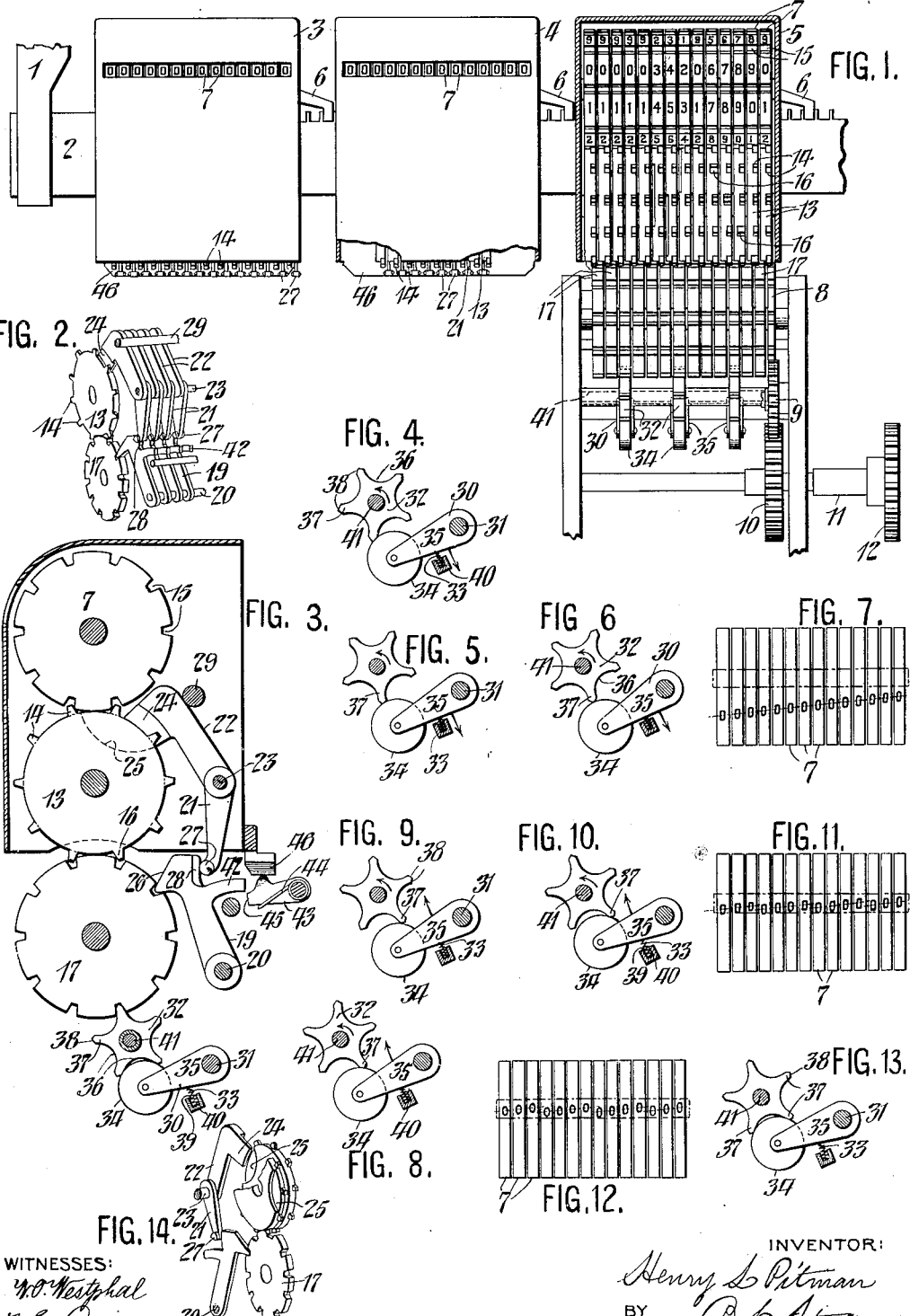

HENRY L. PITMAN, OF EAST ORANGE, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,341,995.        Specification of Letters Patent.      Patented June 1, 1920.

Application filed May 19, 1915, Serial No. 29,039. Renewed February 3, 1919. Serial No. 274,634.

*To all whom it may concern:*

Be it known that I, HENRY L. PITMAN, a citizen of the United States, residing in East Orange, in the county of Essex and State of New Jersey, have invented certain new and useful Improvements in Combined Typewriting and Computing Machines, of which the following is a specification.

My invention relates to computing machines, and is herein disclosed as an improvement on my co-pending application No. 24,390, filed April 28, 1915, (now Patent No. 1,308,506, dated July 1, 1919), wherein the computing machine shown is a combined typewriting and computing machine of the master-wheel type, and in which there are a master wheel and a series of carry-over wheels fixed relatively to the plane of the master wheel, while a totalizer, comprising computing wheels and dial wheels, travels across said master wheel and said carry-over wheels, so that each computing wheel of the totalizer engages said master wheel and said carry-over wheels *seriatim*. In such machines, and in many other kinds of computing machines, it has been found that to make the carry-over mechanism operate smoothly and accurately, the parts must be carefully ground, finely adjusted, and in other ways the mechanism must be expensively finished. Even with the best of adjustments, finish and manufacture of such parts, it is found that the various computing parts gradually wear, so that the numbers on the dial wheels of the totalizer do not stand in a straight line across the sight-opening of the totalizer, but arrange themselves more or less spirally, relatively to said opening. Such a result is particularly likely to occur when the dial wheels of the totalizer all show "9," and the units wheel is turned to read "0," in which case, all the wheels should simultaneously turn to read "0." In these circumstances there is, in most computing machines, a great tendency for the wheels at the extreme left of the totalizer to be only partly turned to displace their "0's." A similar result is also likely to occur when the wheels all read "0" and are turned to read "9," as is the case in subtracting. These troubles are present to a large degree even if only a part of the wheels of the totalizer stand at "9" or "0," and are turned to the other number by a carry-over operation.

To overcome such troubles, many machines hitherto have been provided with separate power drives for operating the carry-over mechanism, and while such drives are sometimes very efficient, they add complexity to the already complex mechanism, thus increasing not only the expense of building the mechanism, but also the liability of injury due to careless handling or minute imperfections of the parts which only develop after use.

According to my invention, I have found it unnecessary to provide the mechanism with a separate power drive for the carry-over mechanism, and yet at the same time, I have found it possible to design a mechanism which shall not require such careful fitting and polishing of the parts as has hitherto been supposed to be usually necessary. For accomplishing this result, I provide certain wheels of the mechanism, preferably a relatively small number of the carry-over wheels with justifying devices which, in the specific embodiment herein disclosed, comprise star wheels and coöperating spring detents. These devices need not be numerous enough to interfere with the "touch" of the keys when the mechanism is carrying-over a string of "9's," and at the same time are sufficiently numerous to take up a large portion of the lost motion which results from wear or design in the mechanism, with the result that the dial wheels line up the "0's" so nearly straight, that any tendency of them to form spirals will not be seen by the operator, and in fact, can hardly be detected except by practical experts in this art.

I have found it sufficient in the mechanism herein disclosed, to provide such a justifying device at every fourth carry-over wheel, but the exact number of carry-over wheels between said devices will probably be found to vary with the type of dial and computing wheels and carry-over devices associated therewith.

As a part of my invention, I also provide means for preventing overthrow or other unintended movement of wheels of the mechanism intermediate those engaged by star-wheels of the aforesaid justifying devices. In the specific embodiment herein disclosed, there is provided for such purpose a series of detents, one for each carrying wheel not in direct engaging relation with a star-wheel. Each of said detents is provided with an operating member controlled by movements of the computing wheel of the next lower denominational order, the relation of said parts being such that the detents will be caused to engage and lock their associated carrying wheels as the computing wheels are alined or approximately alined by said justifying devices.

One of the advantages resulting from the use of justifying devices of the type and in the manner herein set forth as a part of my invention, will be apparent when considering their peculiar applicability to a totalizer having dial wheels provided with teeth of large peripheral width to provide areas for numbers of a relatively large type. The wheels which intermesh with such large-toothed wheels must have teeth of correspondingly small peripheral width, and these, in turn, must be driven by wheels having teeth of large peripheral width corresponding with those of the dial wheels. The wide and narrow teeth will thus recur throughout the mechanism; and it may happen, as in the form of totalizer herein disclosed, that the wide-toothed wheels will be the ones to which it is desired to apply justifying devices. It will be apparent that the narrow spaces separating the wide teeth of such wheels would be ill adapted for use as camming surfaces to coöperate directly with the teeth or rollers of the spring-detents such as are commonly used in the art. I have overcome this difficulty in a simple and practical manner by providing star-wheels having teeth of relatively small peripheral width to engage in driving relation between the teeth of such wide-toothed wheels, and by using the wide spaces between the teeth of said star-wheels as cam surfaces to coöperate with rollers of spring-detents, which will normally tend to cause the wheels of the mechanism to come to rest in a justified or approximately justified position.

An additional advantage resulting from the application of my improved justifying devices, to certain of the wheels of a computing mechanism, in a manner above set forth, is due to the fact that by applying the detented star-wheels to the peripheries of the carrying wheels, I avoid the necessity of adding extra width to the mechanism, as would be the case if the cam surfaces for the detents were applied to hubs extended laterally or in an axial direction from the toothed portions of the carrying wheels. This is of marked advantage in a totalizer such as that herein disclosed, in which the width of the group of wheels corresponding to each denominational order must not exceed the distance which the carriage of the typewriter is caused to advance at each letter-spacing movement.

Another advantageous feature of my invention consists in the application, to a totalizer of the character indicated, of justifying means comprising a minimum number of spring-operated parts, thus simplifying the mechanism, reducing the difficulty of adjustment, and minimizing the amount of work which must be performed by the number-keys when effecting a computation.

Other features and advantages will hereinafter appear.

In the accompanying drawing,

Figure 1 is a front view of part of an Underwood typewriting machine, showing my invention applied thereto, the computing mechanism so far as shown being largely of the type shown in my aforesaid co-pending application.

Fig. 2, is a perspective view of a carry-over wheel and a computing wheel, and some associated parts.

Fig. 3 is a sectional side view, taken through the right-hand totalizer and associated mechanism shown at the right at Fig. 1.

Figs. 4, 5 and 6 are views showing the positions into which the three detents seen in Fig. 1, are momentarily forced when the dial wheels are in the position shown by the "0's" in Fig. 7.

Fig. 7 is a diagrammatic view showing the spiral position which the "0's" on the dial wheels tend to assume during a carry-over through the entire set of wheels.

Figs. 8, 9 and 10 are views similar to Figs. 4, 5 and 6, but showing the detents as acting positively on the dial wheels to shift them from the point shown in Fig. 11 to that shown in Fig. 12.

Fig. 11 is a view similar to Fig. 7, but showing the dial wheels almost, but not quite, alined by the detents.

Fig. 12 is a view similar to Fig. 11, but showing the dial wheels completely alined.

Fig. 13 is a view showing any of the detents seen in Figs. 8, 9 and 10, when the dial wheels are in the completely alined position shown in Fig. 12.

Fig. 14 is a perspective view similar to Fig. 2, but showing the parts from the opposite side.

On the front of the carriage 1, of an Underwood typewriting machine, is a rack bar 2, on which are adjustably mounted three totalizers, 3, 4 and 5, by means of arms 6. Each totalizer includes a series of dial wheels 7, which are adapted to be turned *seriatim* by connections which will be described below, by a master wheel 8, said master wheel being connected by gears 9 and 10, to a shaft 11, which may be driven through a gear wheel 12, from the numeral keys by the connections shown in my copending application No. 24,390 aforesaid, but not shown herein. As the typewriter carriage travels along step by step at the actuation of the numeral keys, the dial wheels are connected *seriatim* to the master wheel 8 by means of computing wheels 13, there being one computing wheel 13 for each dial wheel 7, and each dial wheel being constantly in mesh with its computing wheel, said computing wheels being provided with widely spaced teeth 14, which enter recesses 15 in the dial wheels, said recesses being formed between the wide faces of the dial wheel teeth, which carry the numerals on their projecting peripheries.

In order to enable an operative to compute numbers on the dial wheels 7, the computing wheels are each provided with a carry-over tooth 16, which is effective once in each revolution of the dial wheel to turn the adjoining computing wheel one space. This is done when the dial wheel turns from "9" to "0," or from "0" to "9," thus effecting the familiar carry-over operation of addition, or the borrowing operation of subtraction. To enable the computing wheels to accomplish this, each computing wheel is adapted to mesh with a carry-over wheel 17, each carry-over wheel normally occupying a position such that it overlaps the periphery of the computing wheel next lower in denomination, but fails to mesh with the teeth 14 of said lower computing wheel, because said teeth 14 only extend part way axially of the computing wheel. The carry-over teeth 16, however, are longer axially than are the other teeth 14, on the computing wheel, and these teeth 16 therefore mesh with and turn the carry-over wheels which are in mesh with the computing wheels next higher in denomination.

It has been found advantageous to make the teeth of the standard odontoid forms, but as will be seen most clearly in Fig. 3, the computing wheel teeth are set very wide apart, and the dial wheel teeth, as indicated above, are of extraordinary peripheral width on their face. This is obtained by omitting the alternate teeth in the first instance and the alternate spaces between the teeth in the second.

The expression "a wheel having teeth of relatively large peripheral width" and similar expressions wherever used in this application are intended to define wheels such as that designated "7" in Fig. 3, in which the dimension of a tooth measured circumferentially along the pitch circle is relatively large compared with the distance between two teeth measured along the same circle. Conversely a "wheel having teeth of relatively small peripheral width" and similar expressions are used to define wheels such as that designated "13" in Fig. 3, in which the dimension of a tooth measured along the pitch circle is relatively small compared with the space between two teeth measured along the same circle.

The carry-over wheels 17 are mounted alongside of the master wheel 8, with the result that as the typewriter carriage travels along, the various computing wheels 13 mesh with the carry-over wheels 17, one after another, in the manner described above.

Means may be provided for preventing accidental turning of the various wheels, so that they will not get out of mesh, the mechanism herein disclosed for such purpose being that shown and described in my copending application No. 24,390, aforesaid, which include the detents 19 for the carry-over wheels 17. These detents are pivoted on a rod 20 forming part of the frame carrying the master wheel and carry-over wheels, and each detent 19 is locked by an arm 21 whenever it is in the carry-over train, unless its carry-over wheel 17 is being turned for the purpose of carrying-over. To accomplish this, there is provided series of operating arms 22, above the rod 23, on which the locking arms 21 are journaled, each of said operating arms including a cam extension 24, which bears against the periphery of the computing wheel next lower in denomination than the computing wheel governed by its detent 19. Whenever said computing wheel lower in denomination is in the act of carrying-over, it stands at such a position that a cut-away portion 25 of its periphery faces the cam 24 of the operating arm 22, with the result that the detent 21 can then swing freely. In the act of carrying-over, the computing wheel 13 therefore unlocks the detent of the carry-over wheel, controlling the computing wheel next higher in denomination, and allows said detent 19 to be cammed out from said carry-over wheel by its wedge-shaped face 26, thus permitting the carry-over wheel to be turned freely. After the carry-over is completed, the cut-away portion 25 brings its edge under the edge of the cam 24, and thereby locks the operating arm 22, and the detent 19 controlled thereby. To accomplish this, the cut-away portion 25 is constructed with rather flat sides, which serve as cams to coöperate with the ends of the cam 24.

Since the computing wheels, as has been indicated above, travel along with their totalizers, the locking arms 21 and operating arms 22 likewise travel along, while the detents 19 remain fixed relatively to the plane of the master wheel. To allow this traveling, the locking arms 21 have beveled-off ends 27, by which they coöperate with beveled backs 28 on the backs of the detents 19. These bevels cam the parts respectively into place, if they are not quite in place already when the carriage feeds from one letter-space to the next. The operating arms 22 are held closely in position by the fixed bar 29, which lies behind them and prevents them from swinging clear of the peripheries of the computing wheels 13, with which they engage.

In order to make this structure work easily, it is advantageous to have the parts a trifle loose; this looseness, as pointed out above, also conducing to economy in the manufacture of the mechanism, and ease of adjustment of it. Such looseness is, moreover, likely to occur in this and many other types of machines, as the result of prolonged use. The result of such looseness would be that in carrying-over from a long string of "9's," the computing wheels, in turning from "9" to "0" would tend to make the "0's" of the dial wheels read in a diagonal line, analogous to that shown in Fig. 7, though, of course, usually the sight-opening of a totalizer would not permit all these "0's" to be read in such a line. In order to overcome this tendency to become diagonal or spiral in lining-up, the mechanism is provided with a number of spring-actuated detents 30 which are pivoted on a bar 31, fixed in the carry-over frame, and which are effective on the carry-over wheels 17 through pinions or star wheels 32. These detents are only provided for the thousands, tens of millions and hundreds of billions computing wheels. Thus said detents do not accurately aline each computing wheel, but aline every fourth computing wheel, but since every fourth wheel is properly alined, the wheels next higher in denomination thereto are approximately alined. The effect of the action of these detents upon the computing wheels is diagrammatically illustrated in Fig. 12, wherein the illustration is so drawn as to apparently greatly emphasize the irregularity of the wheels.

To make these detents effective in the most efficient way, each detent is provided with a separate spring 33, which normally urges it upward, said spring being of sufficient strength to turn the wheel on which it is immediately effective and the wheels on which it is indirectly effective against whatever friction of parts there may be; but not being much stronger than this. Each detent also includes a freely revolving roll 34 pivoted on the detent arm 35, said roll cooperating with the deeply cut-away portions 36 of its star wheel 32. The teeth 37 of said star wheel are further provided with cam-shaped ends 38, which are so shaped as to make the roll 34 as effective as possible in turning the star wheel 32 whenever said wheel is off dead center. Fig. 7 is a diagram illustrating, in exaggerated form, the relative positions which the zeros on the dial wheels would assume at an intermediate step of a computing operation in which the units computing wheel is being driven by the master wheel, so as to cause the units dial wheel to turn from its "9" position to its zero position, assuming that all the dial wheels stood at their "9" positions at the commencement of said operation. Owing to the lag or lost motion between the teeth of the various wheels of the computing train, each of said wheels is caused to lag slightly behind the wheel of the next lower denominational order by which it is being driven, so that the computing wheel of highest denominational order, in the absence of the justifying devices, would have transmitted thereto, through the wheels of the computing train, a degree of rotation materially less than that necessary to turn its associated dial wheel from its "9" position to its zero position. As represented in Fig. 7, it may be assumed that the right-hand dial wheel has received slightly less than half of its rotation from its "9" position to its zero position. At such time, the position which the relative parts of the right-hand justifying device would be caused to assume is illustrated in Fig. 6, and the positions which would be assumed at the same time by the parts of the intermediate and left-hand justifying devices are illustrated, respectively, by Figs. 5 and 4. On further movement of the right-hand computing wheel by the master wheel, to complete the "9" to zero rotation of the units dial wheel, the parts of the right-hand justifying devices would be caused to approach the relative position illustrated in Fig. 10, in which the roller of the detent has been brought almost to its final position between the teeth of the star wheel. During the rotation of the star wheel from its dead center position, indicated as being nearly attained in Fig. 6, to the Fig. 10 position, the movement of the said star wheel, and of the gears in driving relation therewith, is assisted by the spring of the detent, which tends to drive the star wheel to the position represented in Fig. 13. As the parts of the right-hand justifying device are changed from the positions indicated in Fig. 6 to those indicated in Fig. 10, the positions of the parts of the intermediate justifying device will be caused to change from the positions indicated in Fig. 5 to those indicated approximately in Fig. 9, and the positions of the parts of the left-hand justifying device will be changed from the positions indicated in Fig. 4 to those approximately indicated in Fig. 8; the movements of the parts in each instance being assisted by the spring 33, as each star wheel is primed by its associated carrying wheel slightly beyond its dead center relation with its associated roller. Fig. 11 represents approximately the positions which the various dial wheels might be caused to assume at about the time when the right-hand computing wheel has received its complete rotation by the master wheel, at which time the star wheels will be in motion as a result of the driving effect of their respective roller detents, and each of said star wheels, as it is advanced, will impart an additional degree of rotation to the computing wheels in driving relation therewith. This operation will continue until the parts of the right-hand justifying device are brought to their final positions, as indicated in Fig. 13. The parts of the intermediate justifying device will first be urged by its spring 33, assisted indirectly through the wheels of the computing train by the right-hand justifying device, to assume the positions shown approximately in Fig. 10, and will then be further advanced by said spring along to the positions shown in Fig. 13. The parts of the left-hand justifying device will be likewise caused to assume the positions shown in Fig. 13, passing through the intermediate positions shown in Figs. 9 and 10, respectively, after which the parts of the mechanism will be approximately alined, as indicated in exaggerated form in Fig. 12; the computing wheel directly driven by the master wheel and the carrying wheels directly associated with the justifying devices having been brought into direct alinement, and all of the intermediate wheels of the mechanism having been approximately justified, as represented by the positions of the zeros as indicated in Fig. 12, in which the lag or spiral effect in the wheels, extending from the master wheel and from each justifying device to the justifying device to the left thereof, is grossly exaggerated for the purpose of illustration.

The springs 33 are mounted in openings 39 in a bar 40, fixed in the frame which carries the master wheel and the carry-over wheels, and the star wheels 32 are journaled on an arbor 41, likewise mounted in said frame. It may be further remarked that the shape of the star wheels 32 is such that their cut-away portions 36 and cam faces 38 coöperate not only with the rolls 34, but also with the edges of the teeth and the periphery of the carry-over wheels 17. The cam faces 26 of the detents 19 further assist in alining the wheels, this being done by the operating arms 22, which tend to force the detents 19 home between the teeth of the carry-over wheels, as the same are justified or approximately justified by the star wheels and their coöperating spring detents.

The detents 19 are provided with rearwardly-extending shoulders 42, by which they may be locked against the carry-over wheels 17 outside the adding zone. To effect this locking, there is provided a spring-pressed arm 43 for each shoulder 42; each of said arms being normally held upward by its spring 44, so that its flat front surface 45 will bear against the coöperating flat end of its shoulder 42, said surfaces being so nearly vertical that a comparatively weak spring 44 will hold the detent 19 against almost any pressure likely to come against it. Inside the adding zone the arms 43 are swung down to ineffective position. For this purpose the totalizer, as it travels along, brings a cam 46 fast on its casing against the tops of the arms 43, thus swinging them downwardly on their pivot bar. The cam 46 is extended across the totalizer so that the detent 19 for every carry-over wheel to the left of the master wheel 10 is released.

Variations may be resorted to within the scope of the invention, and portions of the improvements may be used without others.

Having thus described my invention, I claim:

1. In a computing machine, the combination with a plurality of wheels having teeth occasionally caused to intermesh so as to connect said wheels in serial order and thus establish an extended driving train, of justifying means for reducing the lag or spiral effect in said train due to play between said teeth, said justifying means comprising pinions having teeth to engage in driving relation with certain of the wheels of said train, and means normally tending to turn each of said pinions, and the wheels in driving relation therewith, to a justified or approximately justified position at each operation of said machine involving a rotation of said wheels.

2. In a computing machine, in combination, a series of computing wheels, a series of carrying wheels, said wheels having teeth for occasionally bringing wheels of one of said series into intermeshing engagement, in alternate order, with certain wheels of the other series, to connect them in serial relation so as to establish an extended driving train, justifying means for reducing the lag or spiral effect in said train due to play between said teeth, said justifying means comprising pinions having teeth to engage in driving relation with certain of the wheels of one of said series, and means normally tending to turn each of said pinions, and the wheels in driving relation therewith, to a justified or approximately justified position at each operation of said machine involving a rotation of said wheels.

3. In a computing machine, in combination, a series of computing wheels, a series of carrying wheels, said wheels having teeth for occasionally bringing wheels of one of said series into intermeshing engagement, in alternate order, with certain wheels of the other series, to connect them in serial relation so as to establish an extended driving train, justifying means for reducing the lag or spiral effect in said train due to play between said teeth, said justifying means comprising pinions having teeth to engage in driving relation with certain of said carrying wheels, and means normally tending to turn each of said pinions, and the wheels in driving relation therewith, to a justified or approximately justified position at each operation of said machine involving a rotation of said wheels.

4. A computing machine comprising, in combination, a series of dial wheels having teeth of large peripheral width, compared with the spaces between them, so as to provide areas for characters of relatively large type, a series of computing wheels having teeth of relatively small peripheral width to mesh with the wide teeth of said dial wheels, a series of carrying wheels having teeth of large peripheral width to mesh with the narrow teeth of said computing wheels, certain of said carrying wheels being occasionally brought into meshing relation, in alternate order, with certain of said computing wheels, so as to form therewith an extended driving train, and justifying means for reducing the lag or spiral effect in said train due to play between said teeth, said justifying means comprising starwheels having teeth of narrow peripheral width to enter the spaces between the wide teeth of certain of said carrying wheels, so as to mesh therewith in driving relation, a movably mounted roller for each star-wheel, and means normally tending to urge said roller into the wide spaces between the teeth of its associated star-wheel, so as to turn said star-wheel, and the wheels in driving relation therewith, to a justified or approximately justified position at each operation of said machine involving a rotation of said wheels.

5. A computing machine comprising, in combination, a series of dial wheels having teeth of large peripheral width compared with the spaces between them, so as to provide areas for characters of relatively large type, a series of computing wheels having teeth of relatively small peripheral width to mesh with the wide teeth of said dial wheels, a series of carrying wheels having teeth of large peripheral width to mesh with the narrow teeth of said computing wheels, certain of said carrying wheels being occasionally brought into meshing engagement, in alternate order, with certain of said computing wheels, so as to form therewith an extended driving train, justifying means for reducing the lag or spiral effect in said train due to play between said teeth, said justifying means comprising pinions having teeth of narrow peripheral width to enter the spaces between the wide teeth of certain of said carrying wheels, so as to mesh therewith in driving relation, and means normally tending to turn each of said pinions, and the wheels in driving relation therewith, to a justified or approximately justified position at each operation, said machine involving a rotation of said wheels, and means, including a series of detents for engaging other wheels of said train when brought to a justified or approximately justified position, to lock and prevent overthrow or accidental movement of said detent-engaged wheels and wheels in meshed relation therewith.

6. A computing machine comprising, in combination, a plurality of wheels having teeth occasionally caused to intermesh so as to connect said wheels in serial order and thereby establish an extended driving train, alternate wheels of said train having teeth of large peripheral width compared with the spaces between them, and the intervening wheels having teeth of relatively small peripheral width to intermesh therewith, and justifying means for reducing the lag or spiral effect in said train due to play between said teeth, said justifying means comprising star-wheels having teeth of narrow peripheral width to enter the spaces between the teeth of certain of said alternate wide toothed wheels, so as to mesh therewith in driving relation, a movably mounted roller for each star-wheel, and means normally tending to urge said roller into the wide spaces between the teeth of its associated star-wheel, so as to turn said star-wheel, and the wheels in driving relation therewith, to a justified or approximately justified position at each operation of said machine involving a rotation of said wheels.

7. In a computing machine, in combination, a plurality of wheels having teeth occasionally caused to intermesh, so as to connect said wheels in serial order and thereby establish an extended driving train, alternate wheels of said train having teeth of large peripheral width compared with the spaces between them and the intervening wheels having teeth of relatively small peripheral width to intermesh therewith, justifying means for reducing the lag or spiral effect in said train due to play between said teeth, said justifying means comprising starwheels having teeth of narrow peripheral width to enter the spaces between the teeth of certain of said alternate wide toothed wheels, so as to mesh therewith in driving relation, and means normally tending to turn each of said star-wheels, and wheels in driving relation therewith, to a justified or approximately justified position at each operation of said machine involving a rotation of said wheels, and means, including a series of detents having teeth to enter the spaces between teeth of other of said alternate wide toothed wheels, when brought to a justified or approximately justified position, to lock and prevent overthrow or accidental movement of said detent-engaged wheels, and other wheels in meshed relation therewith.

8. In a computing machine, the combination with a plurality of wheels having teeth occasionally caused to intermesh so as to connect said wheels in serial order and thus establish an extended driving train, of justifying means for reducing the lag or spiral effect in said train due to play between said teeth, said justifying means comprising pinions having teeth to engage in driving relation with certain of the wheels of said train, and means normally tending to turn each of said pinions, and the wheels in driving relation therewith, to a justified or approximately justified position, at each operation of said machine involving a rotation of said wheels, and means, including a series of detents, for engaging other wheels of said train, when brought to a justified or approximately justified position, to lock and prevent overthrow or accidental movement of said detent-engaged wheels, and wheels in meshed relation therewith.

9. In a computing machine, in combination, a series of computing wheels, a series of carrying wheels, said wheels having teeth for occasionally bringing wheels of one of said series into intermeshing engagement, in alternate order, with certain wheels of the other series to connect them in serial relation, so as to establish an extended driving train, justifying means for reducing the lag or spiral effect in said train due to play between said teeth, said justifying means comprising pinions having teeth to engage in driving relation with certain of said carrying wheels, and means normally tending to turn each of said pinions, and the wheels in driving relation therewith, to a justified or approximately justified position, at each operation of said machine involving a rotation of said wheels, and means, including a series of detents for engaging others of said carrying wheels when brought to a justified or approximately justified position, to lock and prevent overthrow or accidental movement of said detent-engaged wheels and the wheels in meshed relation therewith.

10. In a computing machine, in combination, a series of computing wheels, a series of carrying wheels, said wheels having teeth for occasionally bringing wheels of one of said series into intermeshing engagement, in alternate order, with certain wheels of the other series to connect them in serial relation, so as to establish an extended driving train, justifying devices for reducing the lag or spiral effect in said train due to play between said teeth, said justifying devices comprising pinions having teeth to engage in driving relation with certain of said carrying wheels, and means normally tending to turn each of said pinions, and the wheels in driving relation therewith, to a justified or approximately justified position at each operation of said machine involving a rotation of said wheels, and means, including a series of detents for engaging others of said carrying wheels when brought to a justified or approximately justified position, to lock and prevent overthrow or accidental movement of said detent-engaged wheels and the wheels in meshed relation therewith, the spacing of said justifying devices and said detents being such that each carrying wheel provided with a justifying device will be separated by one or more carrying wheels provided with detents.

11. A computing machine comprising, in combination, a wheel having teeth of large peripheral width, compared with the relatively narrow spaces between them, and justifying means therefor, comprising a star-wheel having teeth of narrow peripheral width to enter the spaces between the teeth of said wheel, so as to mesh therewith in driving relation, a movably mounted roller, and means, effective at each rotation of said wheel and its associated star-wheel, normally tending to urge said roller into one of the spaces between the teeth of said star-wheel so as to cause the wheel in mesh therewith to be brought to rest in a justified position.

12. In a computing machine, in combination, a series of computing wheels, a series of carrying wheels, the wheels of one of said series being movable in an axial direction relatively to the wheels of the other series to bring them into and out of coöperative relation, means, including a series of detents, for engaging and holding certain of the wheels of one of said series, when in certain predetermined positions, to prevent unintentional rotation, means normally effective, when one of said detented wheels is not in coöperative relation with a wheel of the other series, for maintaining its detent locked in engaging relation, and means, including parts operated on relative movement between the wheels of said series such as to establish a coöperative relation between one of said detented wheels and a wheel of the other series, for rendering said lock-maintaining means ineffective, so that said detent may be disengaged from said wheel to permit intended rotation thereof.

13. In a computing machine, in combination, a series of computing wheels, a series of carrying wheels, the wheels of one of said series being movable in an axial direction relatively to the wheels of the other series to bring them into and out of coöperative relation, said wheels having teeth for occasionally bringing wheels of one of said series into intermeshing relation, in alternate order, with certain wheels of the other series, to connect them in serial relation so as to establish an extended driving train, means, including a series of detents having teeth capable of entering spaces between teeth of certain of said wheels only when in justified or approximately justified positions, for preventing unintentional rotation thereof, means normally effective when a detented wheel is not in coöperative relation with a wheel of the other series for maintaining its detent locked in engaging relation with its associated wheel, means, including parts operated on relative movement between the wheels of said series such as to establish a coöperative relation between one of said detented wheels and a wheel of the other series, for rendering said lock-maintaining means ineffective, and justifying means for reducing the lag or spiral effect in said train due to play between said teeth, said justifying means comprising pinions having teeth to engage in driving relation with certain of the wheels of said train, and means normally tending to turn each of said pinions and the wheels in driving relation therewith to a justified or approximately justified position, at each operation of said machine involving a rotation of said wheels, so that said lock-maintaining means may be again rendered effective to re-lock said detents in engaging relation with their associated wheels on relative movement, between the wheels of said series, such as to cause the detented wheels to be again out of coöperative relation with the wheels of the other series.

14. In a computing machine, in combination, a series of computing wheels, a series of carrying wheels, the wheels of one of said series being movable in an axial direction relatively to the wheels of the other series to bring them into and out of coöperative relation, means, including a series of detents, for engaging and holding certain of said carrying wheels when in certain predetermined positions to prevent unintentional rotation, means normally effective, when one of said detented carrying wheels is not in coöperative relation with any of said computing wheels, for maintaining its detent locked in engaging relation, and means, including parts operated on relative movement between the wheels of said series such as to establish a coöperative relation between one of said detented carrying wheels and one of said computing wheels, for rendering its lock-maintaining means ineffective, so that said detent may be disengaged from said wheel to permit intended rotation thereof.

15. In a computing machine, in combination, a plurality of totalizers, each comprising a series of computing wheels, operating means therefor including a series of carrying wheels available in common for use in coöperation with computing wheels of any one of said totalizers, the wheels in different series being relatively movable in an axial direction, so that said coöperative relation may be varied at will, means, including a series of detents, for locking certain of said carrying wheels to prevent intended rotation thereof, means normally effective, when a detented carrying wheel is out of coöperative relation with any of said computing wheels, as during relative movement to transfer its coöperative relation from a computing wheel of one totalizer to a computing wheel of another, for maintaining its detent locked, and means, including parts operated on relative movement such as to establish coöperative relation between a detented carrying wheel and a computing wheel of any one of said totalizers, for rendering the lock-maintaining means for its detent ineffective, so that said detent may be disengaged from said wheel to permit intended rotation thereof.

16. In a computing machine, the combination with a totalizer comprising computing wheels, and a master wheel, of carry-over wheels, a carriage for effecting relative travel between the computing wheels and the master wheel and carry-over wheels, a detent for each carry-over wheel, a spring-pressed member for each detent normally holding it against its carry-over wheel, means for making said spring-pressed members ineffective within the computing zone, and a device controlled by each computing wheel, adapted to control the detents in the computing zone.

17. In a computing machine, the combination with a totalizer comprising computing wheels, and a master wheel, of carry-over wheels, a carriage for effecting relative travel of the computing wheels and the carry-over wheels, a detent for each carry-over wheel, an arm for each detent, a spring normally holding each arm against its detent to cause the detent to hold its carry-over wheel, a cam on said carriage adapted to cam said arms free of the detents within the computing zone, and devices controlled by the computing wheels for holding the detents within the computing zone.

18. In a computing machine, the combination with a totalizer comprising computing wheels, and a master wheel, of carry-over wheels, a carriage for effecting relative travel of the computing wheels and the carry-over wheels, a detent for each carry-over wheel, an arm for each detent, a spring normally holding each arm against its detent to cause the detent to hold its carry-over wheel, a cam on said carriage adapted to cam said arms free of the detents within the computing zone, a locking arm for each computing wheel journaled within the totalizer and adapted to bear against the detents within the computing zone, and a periphery on each computing wheel comprising a cut-away portion, so that the periphery, when cut away, will hold the locking arms effective.

19. In a computing machine, the combination with a totalizer comprising computing wheels, and a master wheel, of carry-over wheels, a carriage for effecting relative travel of the computing wheels and the carry-over wheels, a detent for each carry-over wheel, an arm for each detent normally holding it effective, a cam on the totalizer adapted to cam said arms to ineffective position within the computing zone, and computing-wheel-locking arms adapted to control said detents within the computing zone.

20. In a combined typewriting and computing machine, the combination with a totalizer comprising computing wheels, of carry-over wheels, detents for said carry-over wheels, and a cam on said totalizer for making said detents ineffective to hold said carry-over wheels within the computing zone.

21. In a combined typewriting and computing machine, the combination with a totalizer comprising computing wheels, of carry-over wheels, a series of detents for said carry-over wheels, means controlled by a cam on said totalizer for normally rendering said detents effective to hold said carry-over wheels and for rendering them ineffective when within the computing zone, a second series of detents less in number than the computing wheels, and means whereby said second detents may complete the turning of said computing wheels in carrying over.

22. In a computing machine, the combination with a traveling carriage and a totalizer comprising computing wheels, of a master wheel, carry-over wheels adjacent said master wheel, the connections being such that the carriage causes *seriatim* engagement between the computing wheels, the master wheel and the carry-over wheels, detents for said carry-over wheels, detent-controlling means normally rendering said detents effective to hold said carry-over wheels, and a cam on said totalizer to render said controlling means ineffective so as to cause all the detents within the computing zone to be released.

23. In a computing machine, the combination with a totalizer and a traveling carriage, of carry-over wheels, detents for said carry-over wheels, detent-controlling means normally rendering said detents effective to hold said carry-over wheels, and a cam on said totalizer to render said controlling means ineffective so as to cause the detents that lie within the computing zone to be ineffective.

24. In a computing machine, the combination with a traveling carriage and computing wheels carried thereby, of carry-over wheels to be engaged by said computing wheels as the carriage travels past said carry-over wheels, detents for said carry-over wheels, spring-pressed members to engage said detents and maintain them in effective position, carriage-actuated means for withdrawing said spring-pressed members from effective position, and devices mounted on said carriage and controlled by said computing wheels for engaging said detents and locking the same in effective position, except when said computing wheels are positioned for carry-over action.

HENRY L. PITMAN.

Witnesses:
 ARTHUR E. GRINNELL,
 FREDERICK A. HART.